Figure 4:
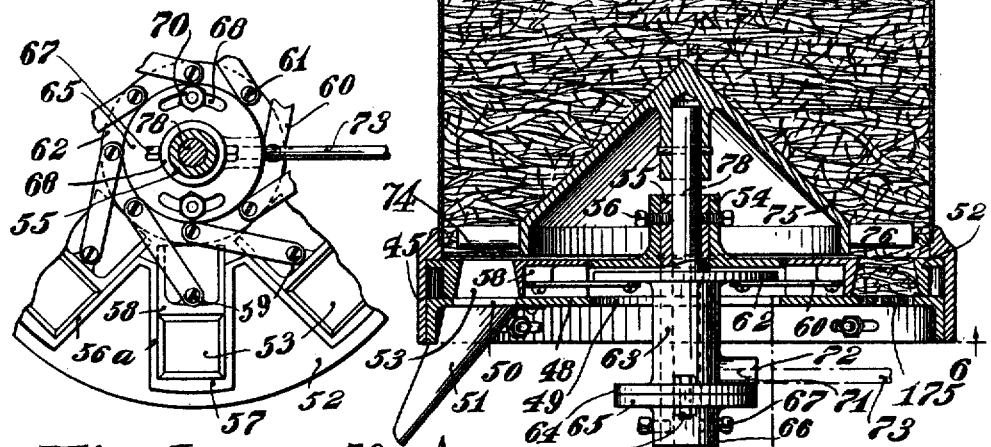

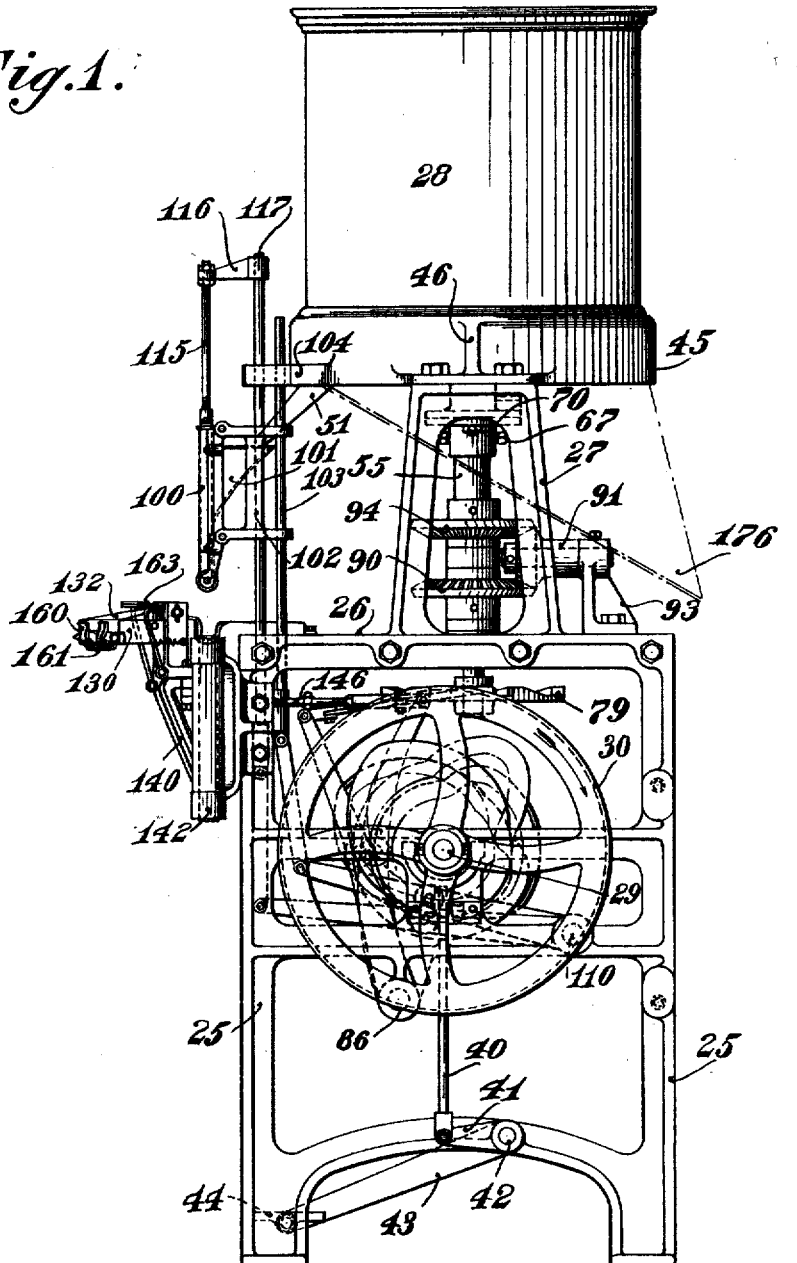

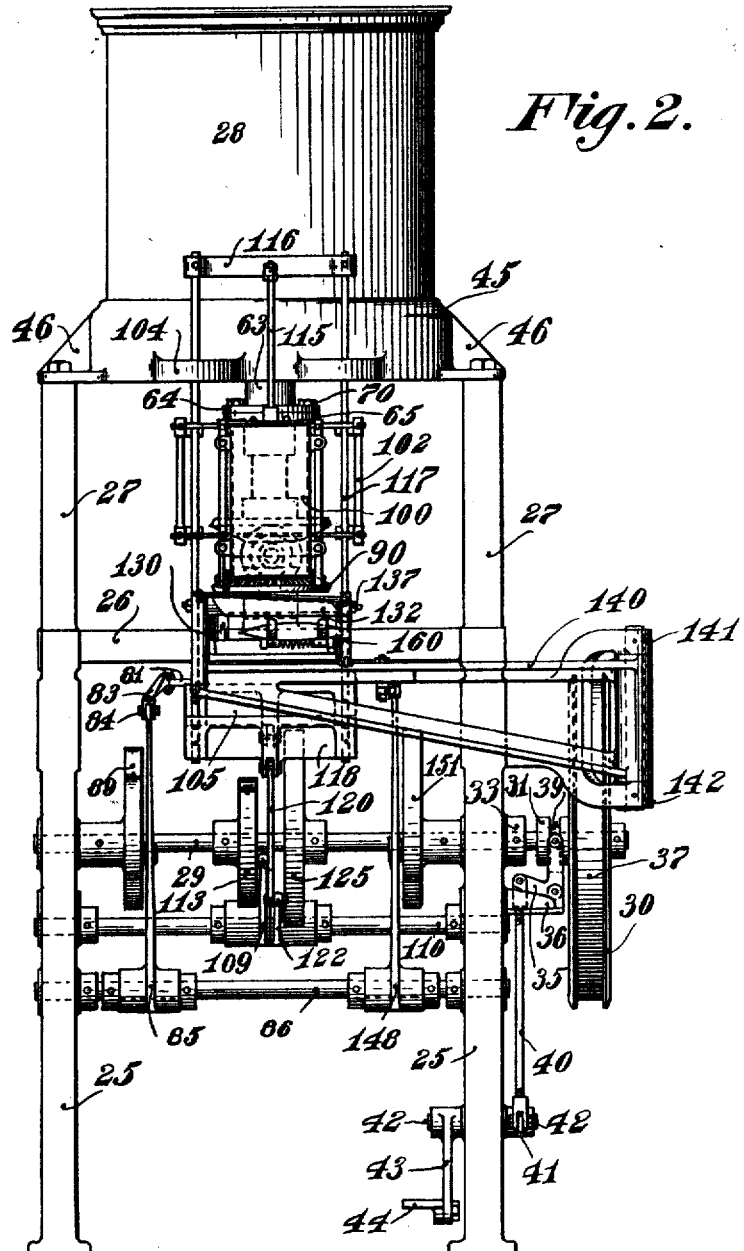

B. LIBERMAN & J. C. WOBENSMITH.
CIGAR BUNCHING MACHINE.
APPLICATION FILED JUNE 19, 1912.

1,214,193.

Patented Jan. 30, 1917.
8 SHEETS—SHEET 3.

WITNESSES:
Percival N. Reed.
Mae Hofmann.

INVENTORS
Bernard Liberman
And James C. Wobensmith
BY
their ATTORNEY.

B. LIBERMAN & J. C. WOBENSMITH.
CIGAR BUNCHING MACHINE.
APPLICATION FILED JUNE 19, 1912.
1,214,193.
Patented Jan. 30, 1917.
8 SHEETS—SHEET 4.
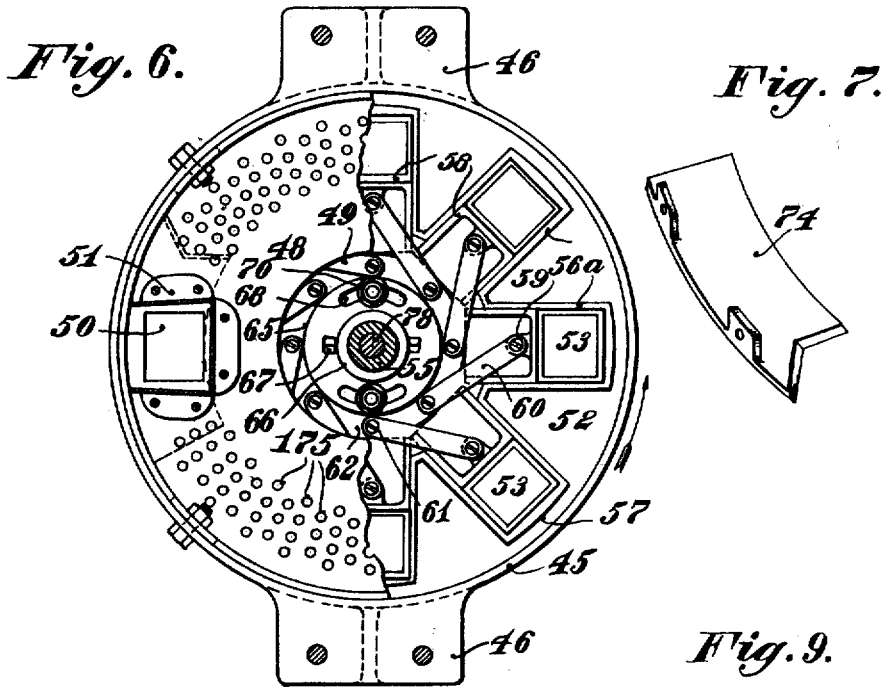
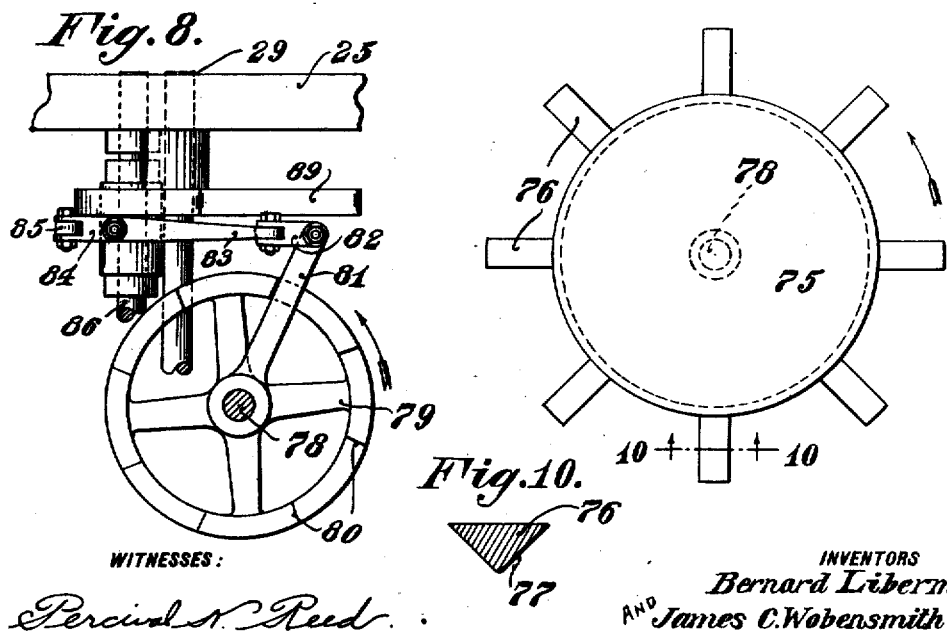
WITNESSES:
INVENTORS
Bernard Liberman
AND James C. Wobensmith
BY
their ATTORNEY.

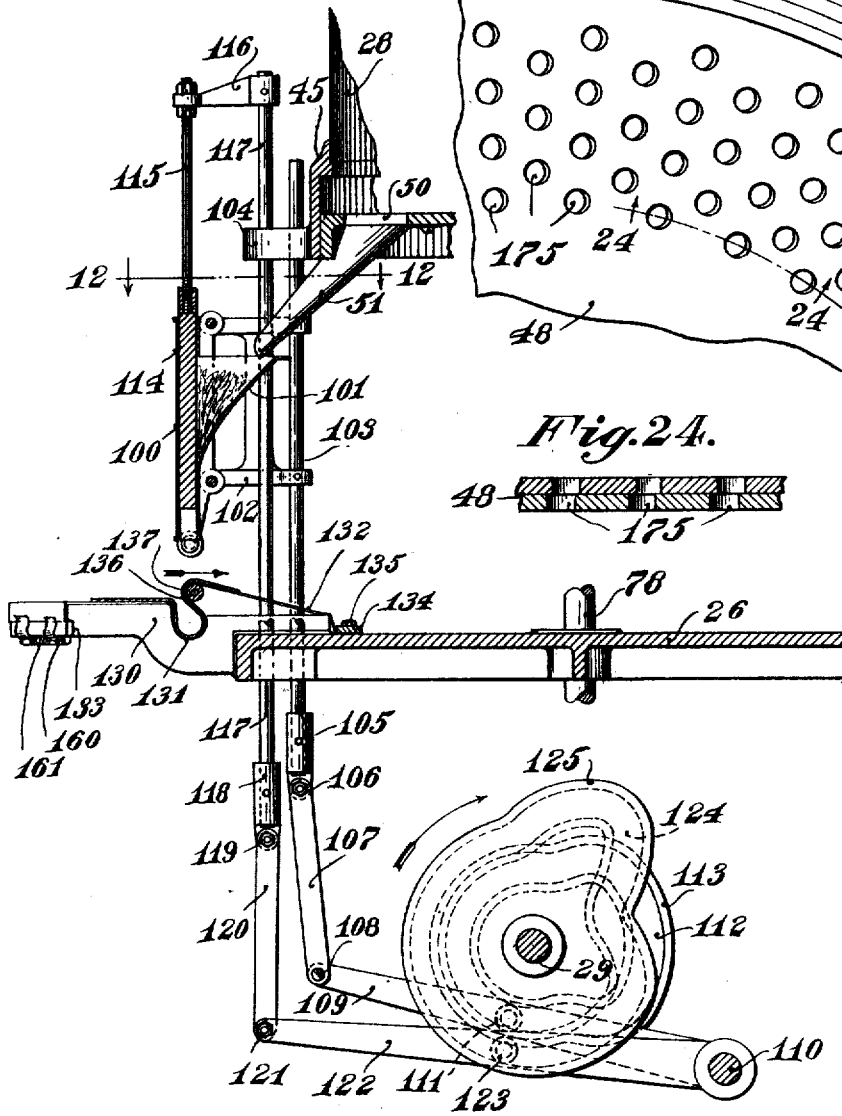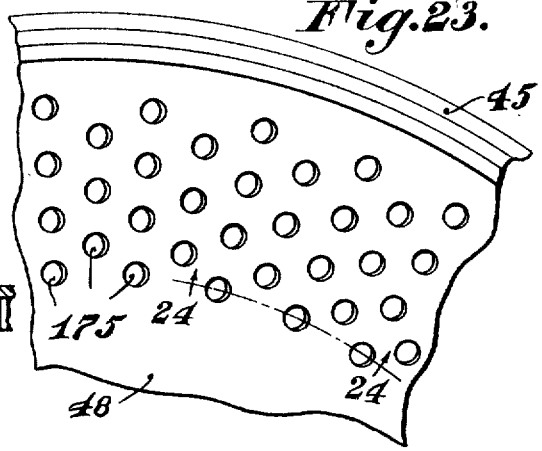

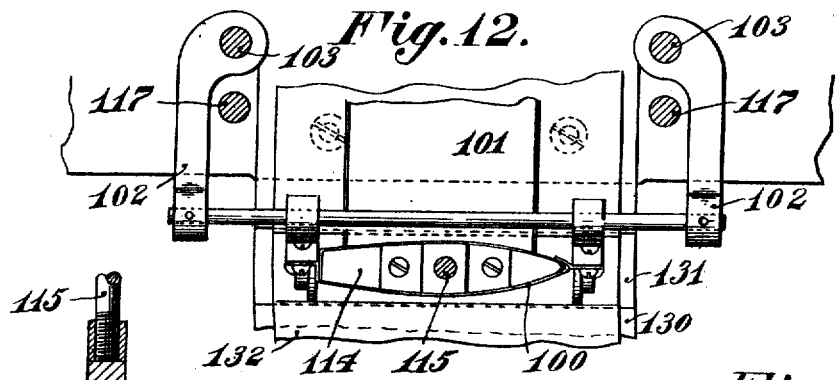
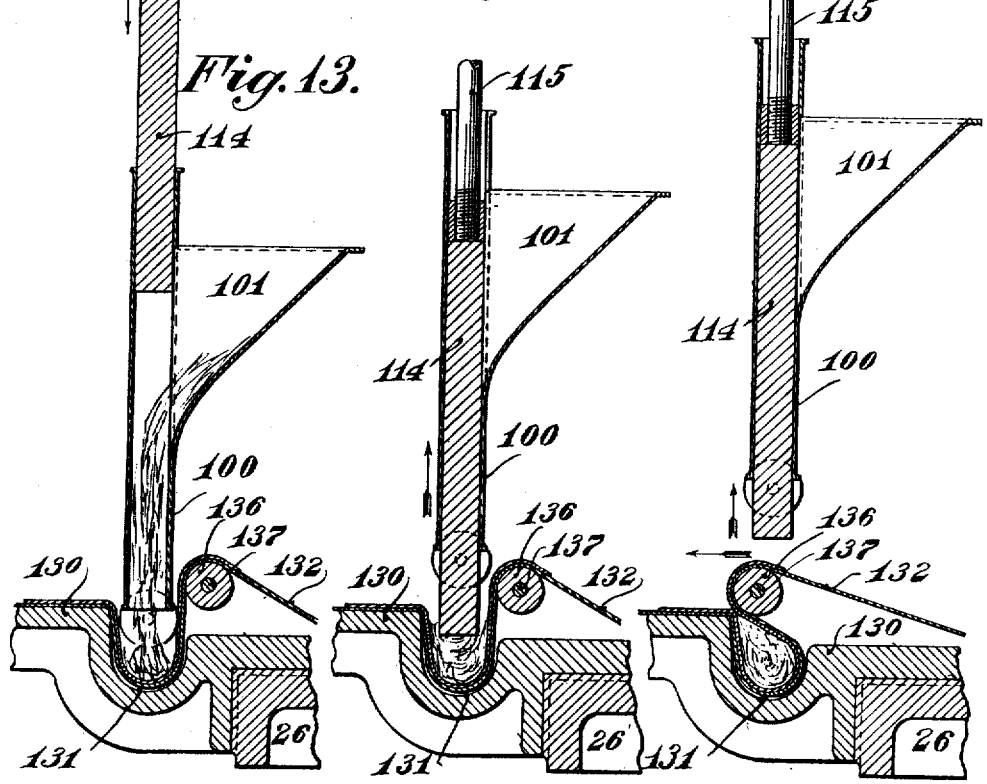

B. LIBERMAN & J. C. WOBENSMITH.
CIGAR BUNCHING MACHINE.
APPLICATION FILED JUNE 19, 1912.

1,214,193.

Patented Jan. 30, 1917.
8 SHEETS—SHEET 7.

WITNESSES:
Percival N. Reed.
Mae Hofmann.

INVENTORS
Bernard Liberman
And James C. Wobensmith
BY
Their ATTORNEY.

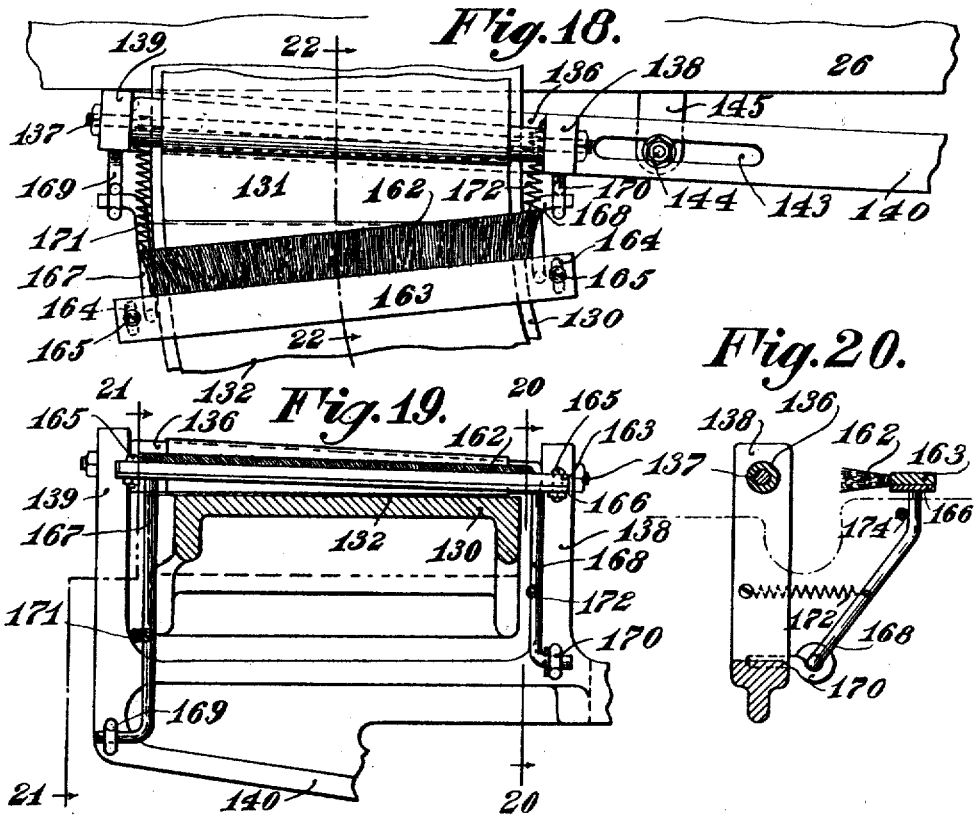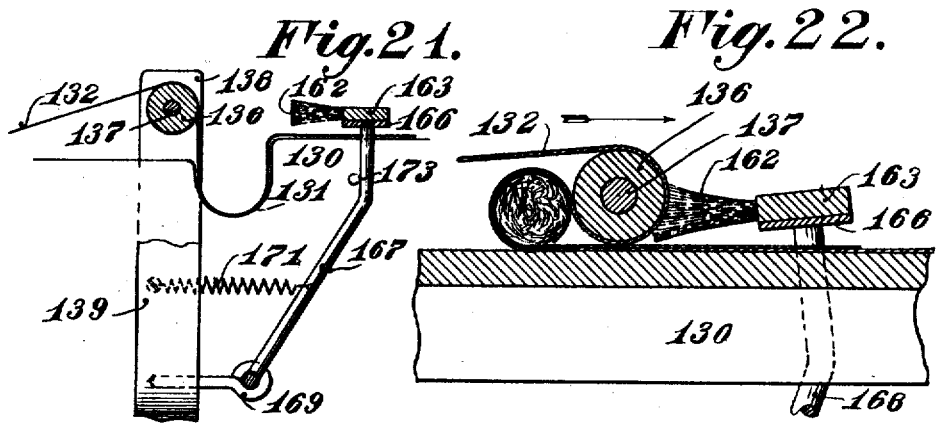

UNITED STATES PATENT OFFICE.

BERNARD LIBERMAN AND JAMES C. WOBENSMITH, OF PHILADELPHIA, PENNSYLVANIA; SAID WOBENSMITH ASSIGNOR TO SAID LIBERMAN.

CIGAR-BUNCHING MACHINE.

1,214,193.  Specification of Letters Patent.  Patented Jan. 30, 1917.

Application filed June 19, 1912. Serial No. 704,578.

*To all whom it may concern:*

Be it known that we, BERNARD LIBERMAN and JAMES C. WOBENSMITH, citizens of the United States, residents, respectively, of Philadelphia, in the county of Philadelphia, State of Pennsylvania, have invented a new and useful Cigar-Bunching Machine, of which the following is a specification.

Our invention relates to a cigar bunching machine, that is to say, to a machine for forming a "bunch" made up of a binder containing a quantity of scrap or short filler which is distributed within the binder in the proper shape and rolled to form the bunch ready to receive the wrapper which is put on subsequently either by hand or with the aid of other machines.

Our invention therefore contemplates a machine, largely automatic, for forming bunches from short filler or scrap tobacco.

The principal object of our present invention is to provide an improved machine for forming short filler bunches and which is so organized as to enable larger sized scrap to be automatically fed than has heretofore been possible in practical machines, and thereby producing a machine-made cigar of more desirable qualities than heretofore.

A further object of our invention is to simplify and render more efficient the mechanism for measuring and feeding the filler and to render said mechanism more easy of adjustment.

A further object of our invention is to simplify the "funnel" mechanism for guiding the filler to the bunching table as well as to improve the bunching machanism proper.

Our invention also contemplates a machine wherein the main operating parts are so located as to preclude the dropping of oil into the tobacco as has frequently occurred in machines wherein the operating cams and other parts were located above the hopper in which the mass of filler is contained.

Our invention results in a more compact and efficient machine for the designed purpose than has heretofore existed.

The nature and characteristic features of our invention will be more readily understood from the following description taken in connection with the accompanying drawings forming part hereof, in which—

Figure 5:
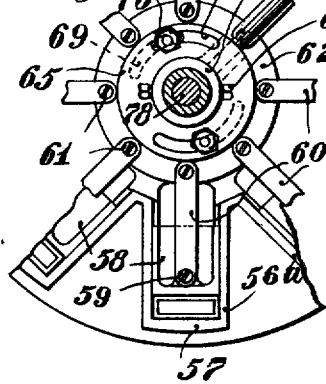
Figure 3:
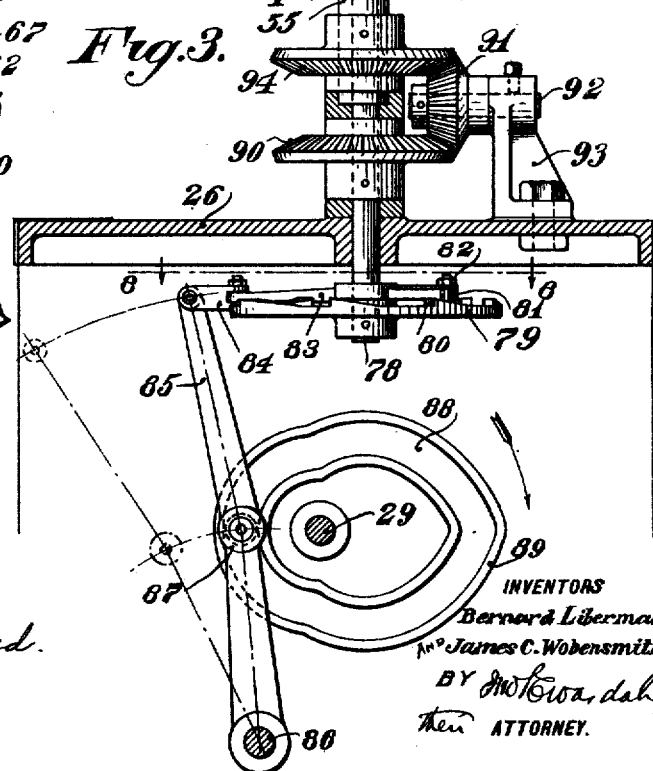
Figure 16:
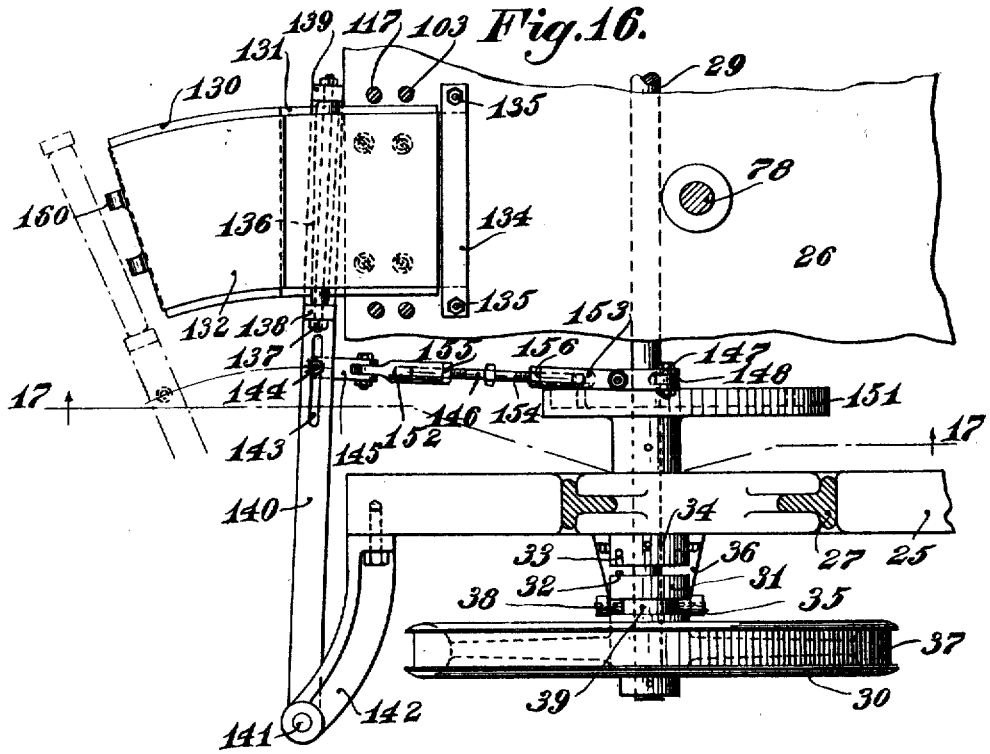
Figure 17:
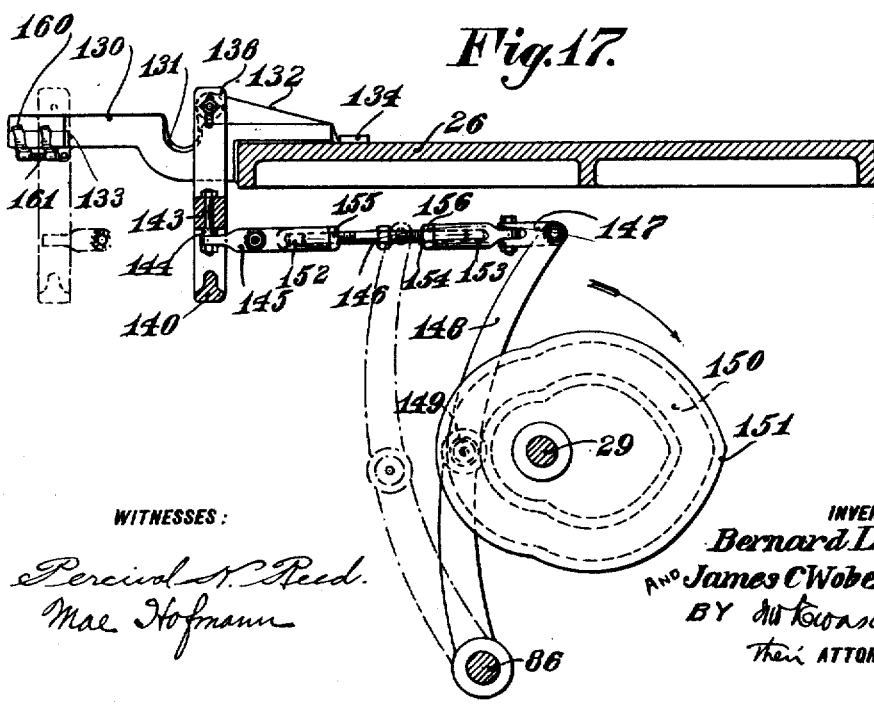

Figure 1 is a side elevation of a cigar bunching machine embodying the main features of our present invention. Fig. 2 is a front elevation thereof. Fig. 3 is a vertical central section of the hopper for containing the filler and the associated feeding mechanism. Fig. 4 is a fragmentary underneath plan view of a portion of the feeding mechanism at the base of the hopper, the measuring pockets being shown enlarged to their fullest extent for the purpose of making the largest sized bunch within the capacity of the machine, the view being taken approximately on the line 4—4 of Fig. 3. Fig. 5 is a view similar to Fig. 4, but with the measuring pockets reduced to their smallest size. Fig. 6 is an underneath plan view of the feed hopper with the operating shafts shown in section on the line 6—6 of Fig. 3, and having the base plate partly broken away to expose the arrangement of the measuring pockets. Fig. 7 is a perspective view of a plate which is mounted within the hopper and which serves to prevent the filler within the hopper from passing through the measuring pocket as the same discharges its contents to the funnel. Fig. 8 is a horizontal section, taken approximately on the line 8—8 of Fig. 3, showing in fragmentary detail a portion of the mechanism for operating the feeding device. Fig. 9 is a top plan view of an agitator which is mounted within the hopper and has a series of arms shaped to insure the depositing of a uniform quantity of filler in each of the measuring pockets. Fig. 10 is a vertical section taken on the line 10—10 of Fig. 9 of one of the arms of the agitator. Fig. 11 is a vertical fragmentary section showing the funnel and its associated operating mechanism for guiding the filler from the feed hopper to the bunching table. Fig. 12 is a horizontal section of a portion of the mechanism shown in Fig. 11, enlarged, the view being taken approximately on the line 12—12 of Fig. 11. Figs. 13, 14 and 15 are vertical central sections enlarged of a portion of the mechanism shown in Fig. 11 and showing respectively different positions of the funnel and its plunger which serves to insure the delivery of the filler to the bunching apron at the proper time as well as insuring the complete delivery of the measured portion of the filler to the bunching apron. Fig. 16 is a fragmentary plan view of a portion of the main bed of the machine showing the bunching table mounted thereon and the bunching roller and the mechanism for actuating the same. Fig. 17 is a vertical section taken approximately on the line 17—17 of Fig. 16. Fig. 18 is an enlarged fragmentary plan view of a portion of the bunching mechanism. Fig. 19 is an elevational view of the mechanism shown in Fig. 18, with the bunching table shown in section. Figs. 20 and 21 are respectively vertical sections taken approximately on the lines 20—20 and 21—21 of Fig. 19, showing means for mounting and actuating a brush which serves to smooth the binder as the same is wound around the bunch as well as preventing the filler from escaping from the pocket of the bunching table in which it is first deposited. Fig. 22 is a vertical section taken approximately on the line 22—22 of Fig. 18, but with the bunching roller, apron and brush being shown in their operative positions. Fig. 23 is a fragmentary detail in plan of the base portion of the hopper. Fig. 24 is a section on line 24—24 of Fig. 23.

Similar numerals refer to similar parts throughout the several views.

Referring to the drawings in the particular embodiment of our invention therein shown, 25, 25, are the side frames of the machine supporting a central horizontal bed 26 and having vertical extensions 27 upon which is mounted a hopper 28 adapted to contain the filler which is fed in measured quantities to form the bunches. Journaled in the side frames 25 beneath the bed 26 is the main shaft 29 upon which the cams for operating the various parts of the machine are mounted. At one end of the main shaft 29 beyond one of the side frames 25 is mounted the driving pulley 30 which is loosely and slidably journaled thereon but is adapted to be operatively connected with said main shaft 29 at the proper time to cause the same to be rotated and thereby operate the machine. For this purpose the driving pulley 30 may be provided with an elongated hub 31 at one side which may be provided with a pin 32 adapted to enter one of a series of holes 33 in a collar 34 which is pinned to the shaft 29. As before stated, the driving pulley 30 is capable of rotation on the shaft 29 and also of a slight longitudinal movement to enable the pin 32 to enter one of the holes 33 in the collar 34. As shown in the drawings the pulley 30 is adapted to be shifted as aforesaid by means of a bell crank lever 35 which is pivoted to a bracket 36 supported from one of the side frames 25. The bell crank lever 35 has one of its arms forked and is provided with rollers 38 which engage an annular groove 39 in the hub 31 of the pulley 30, and the other arm of the bell crank lever 35 is pivotally connected to one end of a rod 40. The other end of rod 40 is pivotally connected to a lever 41 which is mounted on a stud shaft 42 journaled in the lower part of frame 25. The stud shaft 42 also has a foot lever 43 mounted thereon, which foot lever carries a treadle 44 at its outer free end. The arrangement is such that when the foot lever 43 is depressed the pulley 30 will be shifted on shaft 29 to cause these parts to be operatively connected as hereinbefore set forth.

The mechanism for measuring and feeding a predetermined quantity of the filler will now be described. The hopper 28 within which the filler is contained is provided at its lowermost portion with an annular casting 45 which is provided with integral brackets 46 for mounting the hopper on the vertical extensions 27 of the side frames 25. Mounted within the annular casting 45 is a base plate 48 having a central aperture 49 and a rectangular discharge aperture 50 adjacent the outer edge. A chute 51 is arranged beneath the rectangular discharge opening 50 and serves to guide the measured quantity of filler which passes through the opening 50 at predetermined intervals as will hereinafter be more fully set forth. Supported on the base plate 48 is a measuring plate 52 which comprises a circular casting having arranged near the outer edge a series of measuring pockets 53 which measuring pockets are adapted to successively register with and discharge their contents through the opening 50 in the base plate 48, and for this purpose the measuring device 52 is rotated step by step from the main shaft 29 by a mechanism which will hereinafter be more fully described. The central portion of the measuring plate 52 is provided with a collar 54 which surrounds and is secured to a hollow shaft or sleeve 55. The collar 54 is secured to the shaft 55 by means of set screws 56 so as to cause the measuring device 52 to be rotated step by step in unison with said hollow shaft 55. The base plate 48 is provided with a zone of small perforations or apertures 175 (see Figs. 3 and 6) arranged beneath the path of the measuring pockets 53, these apertures being of such size as to permit the sand or dirt contained within the scrap as well as the tobacco dust to be separated from the measured quantity of tobacco which is to form the bunch. This base plate may be made in two sections with the apertures adapted to register. One plate is movable with respect to the other to vary the size of the apertures as shown in Figs. 23 and 24. To prevent the sand, dirt and tobacco dust which passes through the apertures 175 from falling on the table 26 and the portions of the machine arranged immediately above the same, there may be provided a guard or chute 176 preferably made of sheet metal and inclined toward the rear of the machine as clearly shown in Fig. 1 of the drawings.

The measuring pockets 53 are constructed in such manner as to be capable of arbitrary variation in size for making bunches of various sizes. This variation in the size of the measuring pockets is accomplished in the following manner: The plate 52 is provided with a series of radially disposed box like portions having side walls 56ª, the inner surfaces of which are flared downwardly and the end walls 57 are similarly flared so as to cause the contents of said pockets to be freely discharged at the proper time. Within each of the box like portions which forms the pockets 53 there is arranged a block 58, the side surfaces of which are shaped complemental to the inner surfaces of the walls 56ª. The outer end of block 58, which forms one of the limiting surfaces of the pocket 53, is also flared downwardly in a manner similar to the side and end walls of the pockets. Each block 58 is provided with a pivot 59 to which a link 60 is connected, the other end of said link being pivotally connected as at 61 to a flange 62 of a sleeve 63 which is mounted on the sleeve 55 hereinbefore referred to. The lower end of the sleeve 63 is provided with a flange 64 which engages a flange 65 of another sleeve 66 which is rigidly secured to the sleeve 55 by means of set screws 67. The flanges 64 and 65 are respectively provided with sector slots 68 and 69 through which slots are passed bolts 70 to permit the flanges 64 and 65 to be rigidly clamped together at desired positions. It will be seen that the plate 52 of the measuring device is fixedly located with respect to the hollow shaft or sleeve 55 and that the sleeve 66 and its flange 65 are also fixedly located with respect to said sleeve 55, and by an inspection of Figs. 3, 4 and 5 of the drawings it will be seen that by loosening the bolts 70 and rotating the sleeve 63 with respect to the sleeves 55 and 66, the blocks 58 may be advanced and retracted, through the intermediary of the links 60, in unison with each other in their respective boxes to thereby vary the size of the measuring pockets 53 to any desired extent between the largest as shown in Fig. 4, and the smallest as shown in Fig. 5. For this purpose the sleeve 63 may be provided with a lug 71 having a hole 72 in which a bar 73 may be inserted for arbitrarily rotating the sleeve 63 for the aforesaid purpose, after which the bolts 70 may be fastened to lock the blocks in their desired positions. It should be understood that when the bolts 70 are fastened to clamp the flanges 64 and 65 together that the blocks 58 rotate with the plate 52 in fixed relationship and that the mechanism as above set forth is for the purpose merely of varying the size of the pockets, and that there is no relative motion between the blocks 58 and the plate 52 during the normal operation of the machine.

The upper ends of the pockets 53 communicate with the interior of the hopper 28 and receive the filler therefrom. To prevent, however, a quantity of filler from falling from the hopper 28 through the pocket which is brought in register with the discharge opening 50 in plate 48, a sector plate 74 is mounted on the interior of the hopper, which plate 74 effectually closes the upper end of the particular pocket 53 which is disposed over the opening 50. To prevent the filler from lumping within the hopper 28 and to insure the proper deposit of a uniform quantity of filler in each of the measuring pockets 53, there is provided an agitator which comprises a cone shaped member 75 having a plurality of arms 76, each of said arms having inclined under-surfaces 77 as clearly shown in Fig. 10 of the drawings. The arms 76 will serve to agitate the filler within the hopper and prevent the same from forming in lumps and the inclined under-surfaces of the arms 76 will tend to force the filler into the pockets 53 in uniform quantities so that all of the bunches will be of the same density. The cone 75 is mounted on and rigidly secured to the upper end of a vertical shaft 78 which vertical shaft 78 is journaled at its lower end in the bed 26 and passes through the sleeve 55 hereinbefore referred to and which sleeve serves as a journal for the upper end of said shaft. The lower end of the vertical shaft 78 carries a horizontal ratchet wheel 79 provided with teeth 80 which correspond in number to the number of measuring pockets 53 in the plate 52. Loosely mounted on the shaft 78 above the ratchet wheel 79 is a lever 81 which is connected at its outer end by means of a universal joint 82 to a connecting rod 83. The connecting rod 83 is secured by a universal joint 84 at its other end to the free end of a lever 85. The lever 85 is journaled at its lower end to a transversely extending shaft 86 and is provided midway its extremities with a roller 87 which engages a groove 88 in a cam 89 which is mounted on the main shaft 29 of the machine.

Mounted on the vertical shaft 78 is a bevel gear 90 which meshes with an idler bevel gear 91 which is journaled on a stud shaft 92 supported by a bracket 93 secured to the bed 26. The idler bevel gear 91 meshes with and drives in turn a bevel gear 94 which is mounted on and rigidly secured to the sleeve 55 to which the measuring plate 52 is connected as hereinbefore set forth. It will be seen that with each complete revolution of the main shaft 29, the cam 89, through the above described mechanism, will cause the measuring plate 52 to be rotated a portion of a revolution to bring the next succeeding pocket over the discharge opening 50 in the base plate 48 of the hopper 28. It will also be seen that as the measuring plate 52 rotates in the one direction step by step that the agitator, which is mounted directly on shaft 78, will rotate in the contrary direction with a similar movement.

The mechanism for guiding and delivering the measured quantity of filler from the hopper 28 to the bunching mechanism proper will now be described, reference being had more particularly to Figs. 11 to 15 of the drawings: 100 is a funnel, having a horizontal extension in contour at the discharge similar to that of the bunch to be formed and having on its rear side a pocket 101 which receives the measured quantity of filler from the chute 51. For a purpose to be hereinafter more fully set forth, the funnel 100 is raised and lowered at predetermined intervals and for this purpose it is mounted on a bracket 102 which in turn is mounted upon vertical rods 103. The rods 103 are slidably mounted at their upper ends in an extension 104 integral with the annular base casting 45 of hopper 28 and at their lower ends in the table 26. The lowermost ends of the rods 103 are rigidly secured in a yoke 105 to which a link 107 is pivoted as at 106, which link is pivoted at its other end as at 108 to the outer free end of a lever 109. The other end of lever 109 is journaled on a transversely extending shaft 110 and intermediate the ends of said lever 109 there is mounted a roller 111 which engages a groove 112 in a cam 113 which is mounted on the main shaft 29 of the machine. It will be seen that the funnel will make one complete cycle of movements for each rotation of the main shaft 29.

To prevent the measured quantity of filler from being delivered to the bunching mechanism at an improper time, and also to insure its complete delivery at the proper time, a block 114 is mounted within the funnel 100 in such manner as to be capable of vertical movement with respect thereto. The upper end of the block 114 is connected by means of a rod 115 to a yoke bracket 116 which is carried by the uppermost ends of two vertical rods 117 which are slidably mounted in a manner similar to the rods 103, at their upper portions in the bracket 104 and at their lower portions in a bed or table 26. The lowermost ends of the rods 117 are secured to a yoke 118 to which a link 120 is pivotally connected as at 119, the other end of which link being pivotally connected as at 121 to the outer free end of a lever 122. The other end of the lever 122 is pivotally mounted on the transversely extending shaft 110 and the lever 122 is also provided midway its extremities with a roller 123 which engages a groove 124 in a cam 125 which cam is also mounted on the main shaft 29 of the machine. The various relative positions of the funnel and the block are shown in Figs. 11, 13, 14 and 15 of the drawings and the cams 113 and 125 are so shaped as to cause these parts to occupy their proper relative positions at the proper times.

The bunching mechanism proper will now be described, reference being had more particularly to Figs. 16 to 22 of the drawings: 130 is the bunching table secured to and extending forwardly from the bed 26 and having its side margins curved to permit the swinging of the bunching arm as will hereinafter be described. The bunching table 130 has a transverse recess or pocket 131 arranged beneath the funnel 100. 132 is the bunching apron of the usual type preferably made of canvas having a rubber facing which apron is secured to the front end of the table 130 in any suitable manner, such for example, as a transverse bar 133 (see Fig. 11). The apron 132 is adjustably secured at its rear end behind the table 130 by means of a transverse bar 134 which is secured to the bed 26 by means of bolts 135, one at each end of said bar, so that by loosening the bolts and temporarily relieving the clamping action of the bar 134, the apron may be adjusted to any desired degree of tension. 136 is a tapered bunching roller which is journaled on a spindle 137 which spindle is supported by brackets 138 and 139 which are integral with and project upwardly from the bunching arm 140. The bunching arm 140 is pivoted on a vertical shaft 141 at its end remote from the bunching table 130, the shaft 141 being supported in a bracket 142 which is secured to one of the side frames 25 of the machine. The bunching arm 140 is slotted midway its extremities as at 143 and in this slot there is adjustably mounted a stud bolt 144 which serves as a pivot for a universal joint 145 to which is connected a connecting rod 146. The other end of the connecting rod 146 is connected to a universal joint 147 which is pivotally joined to the free end of a lever 148. The other end of the lever 148 is pivotally mounted on the transversely extending shaft 86 and carries, midway its extremities, a roller 149 which engages the cam groove 150 of a cam 151 which is mounted on the main shaft 29. The connecting rod 146 is adjustable in length and comprises two end members 152 and 153 which are respectively pivoted to the universal joints 145 and 147 and a central right and left hand threaded bolt 154 the threads of which respectively engage the members 152 and 153. There are also provided lock nuts 155 and 156 for preventing improper change in the adjustment of the length of the connecting rod when the same is fixed. It will thus be seen that there is provided a mechanism for oscillating the bunching arm 140 at the proper time in the operation of the machine and that there is also provided means for adjusting the amount of movement of said arm through the shifting of the stud 144 in the slot 143, as well as means for adjusting the definite initial position of said arm by varying the length of the adjustable connecting rod 146.

The apron 132 is of a length sufficient to conform to the pocket 131 of the bunching table when the arm 140 and the roller carried thereby are in the retracted position as shown in Fig. 16, and this extra length of the apron also serves to form a belly behind the bunching roller as the same is swung forward as shown in Fig. 22, and in the manner well known to those skilled in the art. At the forward end of the bunching table 130 there is mounted a clip 160 controlled by a spring 161, which clip serves to receive and retain the finished bunch when the arm and the roller carried thereby reach the extreme forward position. In this manner the bunch is prevented from coming unrolled until the operator has had an opportunity to remove the same.

A brush 162 which is mounted on the bunching arm in front of the roller 136 serves to prevent the filler which is deposited upon the portion of the apron which lies within the pocket 131 from being thrown out and also serves to straighten out the binder as the same is rolled about the filler as will hereinafter be more fully set forth. The back or frame 163 of the brush 162 is provided at each end with a slot 164 through which pass screws 165 which are threaded into a supporting plate 166, this arrangement being provided to permit a slight adjustment of the brush 162 with respect to said supporting plate 166. The supporting plate 166 is provided with two downwardly extending arms 167 and 168 (see Figs. 20 and 21) which arms are of different lengths and are pivoted at their lower ends in eye bolts 169 and 170 which are secured in and carried by the bunching arm 140. The pivots of the respective arms 167 and 168 are preferably located in a line passing through the intersecting axes of the bunching roller 136 and the pivot shaft 141 of the bunching arm. The arms 167 and 168 are also under the tension of springs 171 and 172 which tend to bring the brush in contact with the apron which lies over the bunching roller 136, but when the bunching arm 140 is retracted to the initial position as shown in Figs. 16 to 21 the arms 167 and 168 respectively engage pins 173 and 174 mounted in the sides of the bunching tables 130. The pins 173 and 174 serve to retract the brush from the apron and bunching roller and permit the tobacco to be deposited in that portion of the apron which lies within the pocket 131.

The operation of the machine may now be described. It should be understood that the main shaft 29 makes one complete revolution for each bunch that is formed. When the machine is in its initial position with the bunching arm and the roller carried thereby retracted in the positions shown in Figs. 18 to 21 of the drawings, the operator lays a binder upon the apron 132 and pushes a portion of the binder into the pocket 131 to which the apron conforms. The foot pedal 44 upon being depressed will cause the driving pulley to be brought into operative engagement with the main shaft 29 and the cams mounted thereon will thereby be rotated to actuate the various parts of the machine at the proper times. The cam 89 in its rotation will cause the lever 85 to be actuated and thereby cause the lever 81 through the intermediary of the connecting rod 83 to be actuated and engage one of the teeth of the ratchet 79 and thus rotate the vertical shaft 78 a portion of a revolution. This will cause the agitator and its arms 76 to be rotated a corresponding distance. Simultaneously with the rotation of the cone 75 and its arms 76, the measuring plate 52 will be rotated in a contrary direction and bring the next succeeding measuring pocket 53 in register with the discharge opening 50 in plate 48. The actuation of the measuring plate 52 is effected by means of bevel gears 90, 91 and 94 and the sleeve 55 which surrounds the vertical shaft 78. The measured quantity of filler from the pocket 53 which is thus brought over the discharge opening 50 will fall through said opening and be guided by the chute 51 to the pocket 101 of funnel 100 which funnel is in the raised position at this time on account of the position of its actuating cam 113. The filler will remain within the pocket 101 being held there by the block 114 which at this time will close the passageway between the pocket 101 and the main portion of the funnel 100. The shaft 29 now continuing to rotate will bring a portion of the cam 113 to such position as to cause the lower end of the funnel to be brought in proximity to the pocket 131 in the bunching table 130, the block 114 being meanwhile raised slightly to permit the tobacco to pass from the pocket 101 of the funnel, through the main portion of the funnel and onto the portion of the apron 132 which lies within the pocket 131 of the bunching table. The block 114 will now be caused to descend on account of its cam 125 coming to the proper position and will positively eject any portions of the filler which might tend to remain within the funnel 100 and will also serve to compact and evenly distribute the filler contained within the portion of the apron which lies within the pocket 131 of the bunching table. The shaft 29 meanwhile continuing to rotate will cause the cam 113 to reach a position whereby the funnel 100 will be raised (see Fig. 14), after which the block 114 will be raised by its cam 125 in unison with the funnel 100 (see Fig. 15), and thereafter to the initial position as shown in Fig. 11. After the block 114 is raised a sufficient distance the cam 151 which controls the bunching arm 140 will be brought to such position as to cause the lever 148 to be actuated and through the intermediary of the connecting rod 146 will swing the bunching arm 140 forward and cause the roller 136 to gather up the filler, which has been deposited on the binder previously by the operator on the apron, and roll the same forward in a belly in the apron behind said roller as shown in Fig. 22. The general principle of the roller and the apron formed into a belly behind the roller for the purpose of rolling a bunch is well known in the art and need not be further elaborated upon. As the bunching roller 136 moves forward the brush 162 which is pivotally supported on the bunching arm 140 will be brought into engagement with the portion of the apron which lies over the roller 136 through the action of the springs 171 and 172 after the supporting arms 167 and 168 are carried out of engagement with the projecting pins 173 and 174 which are mounted in the table 130, the action beginning with the beginning of movement of the bunching arm. The brush thereby serves to first close over the pocket and prevent the loose filler from being thrown out and thereafter acts to straighten out and unwrinkle the binder which is rolled around the filler, whereby the bunches will be of uniform size and density.

What we claim is:—

1. In a cigar bunching machine the combination of a hopper having its base portion provided with an annular channel of greater diameter than that of the hopper and a rotating measuring element having its periphery housed within the said channel.

2. A hopper provided in its bottom with a discharge opening and also a region of small apertures, in combination with a measuring element having pockets adapted to register one after the other with the discharge opening.

3. A hopper provided in its bottom with a discharge opening and also a region of small apertures and means for adjusting the size of said apertures, in combination with a measuring element having pockets adapted to register one after the other with the discharge opening.

4. A hopper, having a discharge opening, a measuring element rotating in the hopper, provided with pockets adapted to register successively, with the discharge and an agitator provided with horizontally extending arms having inclined under surfaces adapted to pass over the pockets.

5. A hopper, having a discharge opening, a measuring element rotating in the hopper provided with pockets adapted to register, successively, with the discharge and an agitator provided with horizontally extending arms having inclined under surfaces adapted to pass over the pockets and close thereto.

6. A hopper, having a discharge opening, a measuring element rotating in the hopper provided with pockets adapted to register, successively, with the discharge and an agitator provided with horizontally extending arms having inclined under surfaces adapted to pass over the pockets, and driving mechanism therefor all located below the hopper.

7. A hopper, having a discharge opening, a measuring element rotating in the hopper provided with pockets adapted to register, successively, with the discharge and an agitator comprising a conical body provided with horizontally extending arms at the base thereof having inclined under surfaces adapted to pass over the pockets.

8. In a cigar bunching machine, a table, a bunching apron, a bunching roller coöperating therewith, means for depositing the filler upon the apron, and a brush for preventing the filler deposited upon the apron from being displaced.

9. In a cigar bunching machine, a table, a bunching apron, a bunching roller coöperating therewith, means for depositing a measured bunch of the filler upon the apron and a brush for preventing the filler deposited upon the apron from being displaced.

10. In a cigar bunching machine, a table, a bunching apron, a bunching roller coöperating therewith, means for depositing the filler upon the apron and the binder placed thereon, and a brush for preventing the filler deposited upon the apron from being displaced.

11. In a cigar bunching machine, a table, a bunching apron, a bunching roller coöperating therewith, means for depositing the filler upon the apron, and a brush for operating upon the binder to straighten and smooth out the same.

12. In a cigar bunching machine, a table, a bunching apron, a bunching roller coöperating therewith, means for depositing the filler upon the apron, a brush for preventing the filler deposited upon the apron from being displaced, and means for actuating the brush to coöperate with roller and apron.

13. In a cigar bunching machine, a table, a bunching apron, a bunching roller coöperating therewith, means for depositing the filler upon the apron, a brush for preventing the filler deposited upon the apron from being displaced, and means for actuating the brush to permit the deposit of filler to the apron and then to prevent the same from being thrown from the apron.

14. In a cigar bunching machine, a table provided with a pocket for receiving the filler, a bunching apron and a bunching roller for coöperating therewith, means for depositing the filler upon the apron in the pocket and a brush for preventing the filler deposited upon the portion of the apron which lies within the pocket of the table from being thrown out.

15. In a machine of the character described, a measuring plate having a plurality of radially disposed pockets, a central shaft, the measuring plate being operatively connected therewith, blocks slidably mounted in said pockets, a sleeve rotatably mounted about said central shaft and capable of relative movement with respect thereto, said sleeve having a flange at one end, a plurality of links pivotally connected at opposite ends to said flange and to said blocks, and means for locking said sleeve in desired locations about said shaft, said means comprising a flange at the other end of said sleeve, a flanged member in engagement therewith and also operatively connected with said central shaft, and means for securing said sleeve and flanged member in desired relative positions.

16. In a machine of the character described, a hopper, a plate fixed in the bottom of said hopper, said plate having a discharge opening, a measuring plate mounted above said fixed plate, said measuring plate provided with a plurality of pockets having downwardly flaring side walls, the upper ends of said pockets being in communication with said hopper and the lower ends being closed by said fixed plate, means for successively bringing said pockets over the discharge opening, and means for closing the upper ends of said pockets as they are brought over the discharge opening.

17. In a machine of the character described, a hopper having a discharge opening, a movable element within the hopper provided with measuring pockets adapted to register in turn with said opening, an agitator comprising a cone shaped member provided with a plurality of radially extending arms having inclined under surfaces for preventing lumps and for forcing the filler into the measuring pockets.

18. In a machine of the character described, a hopper having a discharge opening, a rotatable measuring element provided with measuring pockets each adapted to register in turn with the discharge opening, a rotatable agitating element above the measuring element provided with radially extending arms with downwardly converging under surfaces whereby the machine will operate equally well in either direction of movement so long as the agitator element and measuring element move oppositely.

19. In a machine of the character described, a hopper, a plate fixed in the bottom of said hopper having a discharge opening, a measuring plate mounted above said fixed plate having a plurality of downwardly diverging pockets, means for rotating said measuring plate to successively bring said pockets over said discharge opening, a member rotatably mounted in the hopper above said measuring plate having a plurality of agitating arms adapted to pass over said pockets and insure an even deposit of material therein, said arms having inclined under surfaces for the aforesaid purpose.

20. In a machine of the character described, a hopper, a plate fixed in the bottom of said hopper, a measuring device movably mounted above said plate having measuring pockets, the bottoms of which are formed by the fixed plate, and the fixed plate having a plurality of small apertures beneath said measuring pockets to permit the dirt and tobacco dust to be eliminated from the measured quantity of tobacco.

21. In a machine of the character described, a hopper, a plate fixed in the bottom of said hopper, a measuring device movably mounted above said plate having measuring pockets, the bottoms of which are formed by the fixed plate, and the fixed plate having a plurality of small apertures beneath said measuring pockets to permit the dirt and tobacco dust to be eliminated from the measured quantity of tobacco, and a chute arranged beneath said perforations and adapted to guide the separated dirt and dust from the machine.

BERNARD LIBERMAN.
JAMES C. WOBENSMITH.

Witnesses:
MAE HOFMANN,
HOWARD S. OKIE.